United States Patent Office 2,985,659
Patented May 23, 1961

---

2,985,659

11-DIMETHYLAMINO-DESERPIDINE

Leon Velluz, Paris, Georges Muller, Nogent-sur-Marne, Andre Allais, Paris, and Jirair Enezian, Creteil, France, assignors to Les Laboratoires Francais de Chimiotherapie, Paris, France, a corporation of France No Drawing. Filed July 23, 1959, Ser. No. 828,962

Claims priority, application France Oct. 31, 1958

1 Claim. (Cl. 260—287)

This invention relates to 11-dimethylamino-deserpidine, intermediates useful in preparing 11-dimethylamino-deserpidine, such as 6-dimethylamino-tryptamine and process for production of these compounds.

Reserpine is used medicinally as a hypotensor. When used as such, either alone or in combination, it suffers a drawback in that it is also active as a sedative. It is advantageous to obtain a compound which will be as useful as reserpine as a hypotensor without possessing its sedative properties.

An object of the present invention is to obtain 11-dimethylamino-deserpidine having the structural formula

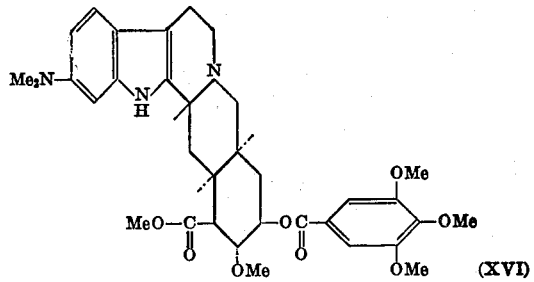

and a melting point of 156 to 160° C.

Another object of this invention is to develop a process for the production of 11-dimethylamino-deserpidine.

A further object of this invention is to obtain intermediates useful in producing 11-dimethylamino-deserpidine such as:

(a) 4-dimethylamino-2-nitrophenyl-ethyl-pyruvate and its alkali metal salts (II).
(b) 6-dimethylamino-2-carbethoxy-indole (III).
(c) 6-dimethylamino-indole-2-carboxylic acid (IV).
(d) 6-dimethylamino-indole (V).
(e) 6-dimethylamino-gramine and its quaternary salts (VI).
(f) 6-dimethylamino-indol-3-yl-acetonitrile (VII).
(g) 6-dimethylamino-tryptamine and its acid addition salts (I).
(h) 18β-acetoxy-11-dimethylamino - 17α - methoxy-16β-carbomethoxy-2-3,3-4-diseco-Δ4(21)-20α-yohimbene - 3-oic acid (IX).
(i) 18β-acetoxy-11-dimethylamino - 17α - methoxy - 16β-carbomethoxy-2-3,3-4-diseco-20α-yohimbane-3-oic acid (X).
(j) 18β-acetoxy-11-dimethylamino - 17α - methoxy - 16β-carbomethoxy-3-keto-2-3-seco-20α-yohimbane (XI).
(k) 18β-acetoxy-11-dimethylamino - 17α - methoxy-16β-carbomethoxy-Δ3(14)-20α-yohimbene (XII).
(l) 18β-acetoxy-11-dimethylamino - 17α - methoxy - 16β-carbomethoxy-3β,20α-yohimbane (XIV) and its 3α isomer (XIII).

(m) 11-dimethylamino-18β-hydroxy - 17α - methoxy-16β-carbomethoxy-3β,20α-yohimbane (XV).

A still further object of this invention is the development of a deserpidine derivative which has the hypotensive effect of reserpine without its sedative effect.

These and further objects of this invention will become apparent as the description proceeds.

11-dimethylamino-deserpidine no longer possesses the sedative properties of reserpine and may therefore be used as a hypotensive agent without secondary effects.

In accordance with the present invention, 11-dimethylamino-deserpidine is prepared starting from 6-dimethylamino-tryptamine and from dextro-rotary 1β-carboxymethyl-2β-carbomethoxy - 3α - methoxy - 4β - acetoxy-6β-formyl-cyclohexane having a specific rotation $$[\alpha]_D^{20} = +42.5° \text{ (c.} = 1\%, \text{ pyridine)}$$

6-dimethylamino-tryptamine is prepared by condensing N,N-dimethyl-2-nitro-p-toluidine with ethyl oxalate in the presence of an alkali metal ethylate. The alkali metal salt of 4-dimethylamino-2-nitrophenylethylpyruvate (II) which is produced, is neutralized and the neutral compound is reduced and cyclized by means of a reducing agent in an acid medium, such as zinc in acetic acid or iron in hydrochloric acid. 6-dimethylamino-2-carbethoxy-indole (III) is produced. This ester is saponified to produce the corresponding acid (IV), which is then decarboxylated into 6-dimethylamino-indole (V). By condensation with dimethylamine and formaldehyde, the 6-dimethylamino-indole is transformed into 6-dimethylamino-gramine (VI). This compound is quaternized with dimethyl sulfate and the sulfomethylate is condensed with an alkali metal cyanide to yield 6-dimethylamino-indol-3-yl-acetonitrile (VII). Catalytic hydrogenation of this compound yields the 6-dimethylamino-tryptamine (I).

Dextro-rotary 1β-carboxymethyl-2β-carbomethoxy-3α-methoxy-4β-acetoxy-6β-formyl-cyclohexane is obtained in accordance with the copending U.S. patent application S.N. 727,780, filed April 11, 1958, now U.S. Patent No. 2,971,978.

The synthesis of 11-dimethylamino-deserpidine from the above-mentioned starting compounds gives the following intermediate derivatives which are novel products and form a part of the present invention:

18β - acetoxy-11-dimethylamino-17α-methoxy-16β-carbomethoxy-2-3,3-4-disecoΔ4(21)-20α-yohimbene-3-oic acid (IX).
18β - acetoxy-11-dimethylamino-17α-methoxy-16β-carbomethoxy-2-3,3-4-diseco-20α-yohimbane-3-oic acid (X).
18β - acetoxy-11-dimethylamino-17α-methoxy-16β-carbomethoxy-3-keto-2-3-seco-20α-yohimbane (XI).
18β - acetoxy-11-dimethylamino-17α-methoxy-16β-carbomethoxy-Δ3(14)-20α-yohimbene (XII).
18β - acetoxy-11-dimethylamino-17α-methoxy-16β-carbomethoxy-3β,20α-yohimbane (XIV).
11 - dimethylamino-18β-hydroxy-17α-methoxy-16β-carbomethoxy-3β,20α-yohimbane (XV).

The following schematic drawings show the course of the reactions involved in producing 6-dimethylamino-tryptamine (I), Table I, and reacting this compound with dextro-rotary 1β-carboxymethyl-2β-carbomethoxy-3α - methoxy-4β-acetoxy-6β-formyl-cyclohexane (II) to produce the desired 11 - dimethylamino-deserpidine (XVI), Table II.

In the tables the customary structural formula designations are used. The solid bond attached to unsaturated ring carbon atoms denotes a β-attachment and the dotted line bond denotes an α-attachment. Et denotes the ethyl radical, Me denotes the methyl radical and Ac denotes the acetyl radical.
TABLE I
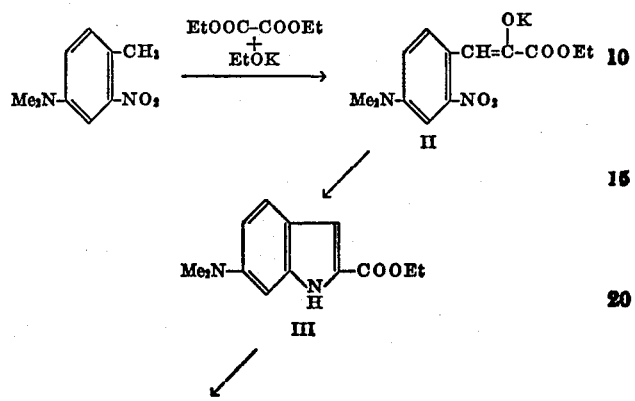
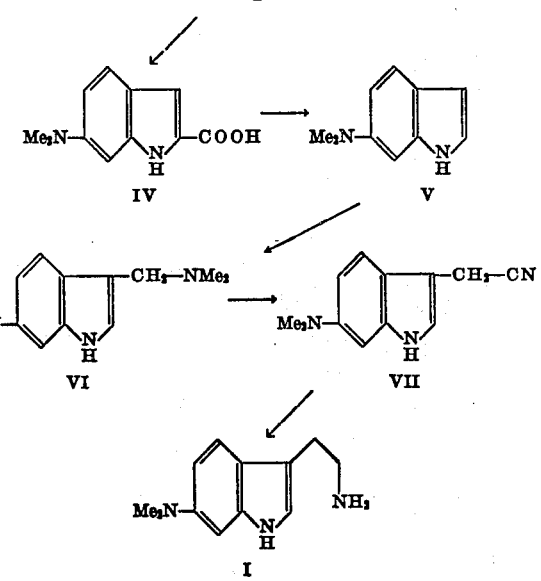
TABLE II
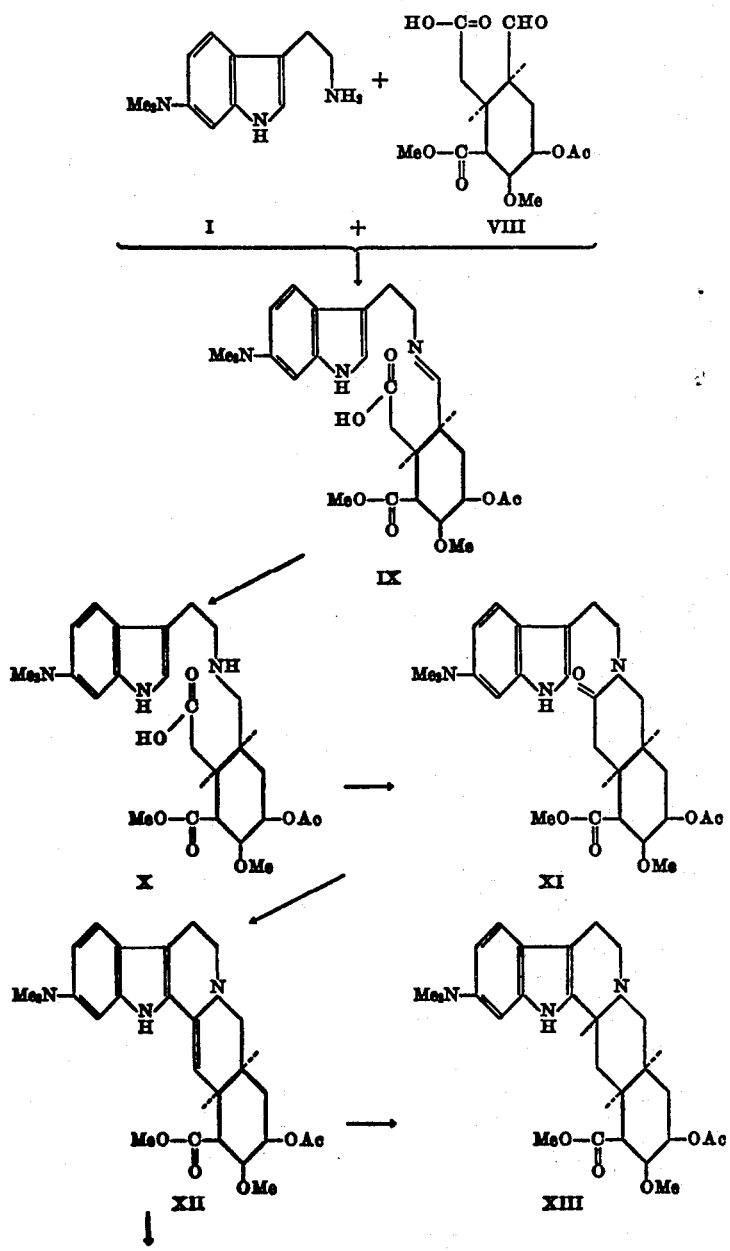

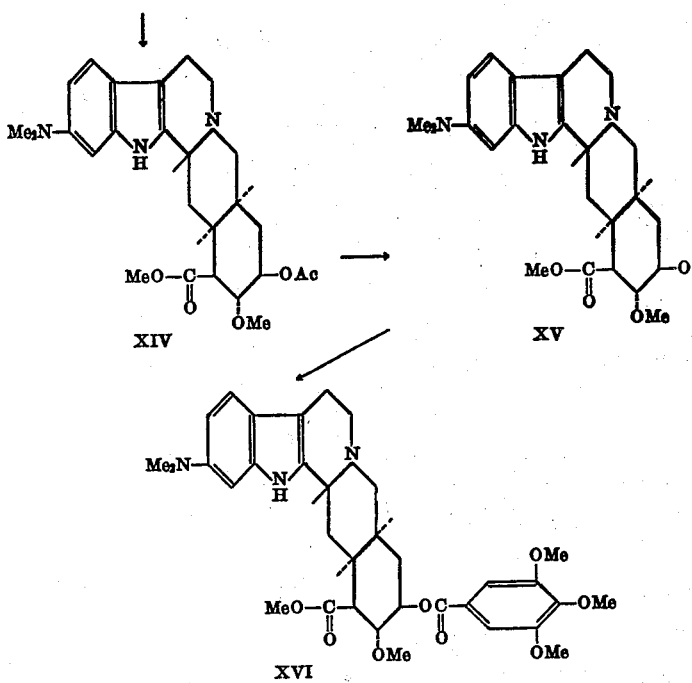

The process of producing 11-dimethylamino-deserpidine (XVI), the object of the present invention, comprises essentially reacting 6-dimethylamino-tryptamine (I) with dextro-rotary (in pyridine) 1β-carboxymethyl-2β-carbomethoxy-3α-methoxy-4β-acetoxy-6β-formyl - cyclohexane (II) in the presence of an organic tertiary base to cause a condensation and production of 18β-acetoxy-11-dimethylamino-17α-methoxy-16β-carbomethoxy-2-3,3-4 - diseco-Δ4(21)-20α-yohimbene-3-oic acid (IX). This yohimbene-3-oic acid (IX) is then reduced with an alkali metal borohydride to give 18β-acetoxy-11-dimethylamino-17α-methoxy-16β-carbomethoxy-2-3,3-4-diseco-20α - yohimbane-3-oic acid (X). The D-ring of compound X is closed by the action of heat to give 18β-acetoxy-11-dimethylamino-17α-methoxy-16β-carbomethoxy-3-keto-2-3-seco-20α - yohimbane (XI). The C-ring of compound XI is closed by treatment with phosphorus oxychloride, yielding 18β-acetoxy-11-dimethylamino-17α-methoxy-16β - carbomethoxy-Δ3(14)-20α-yohimbene (XII). This cyclized product XII is then transformed by reduction with zinc into the corresponding 3α and 3β isomers of 18β-acetoxy-11-dimethylamino - 17α - methoxy-16β-carbomethoxy-20α-yohimbane. The 3β-isomer (XIV) is separated from the 3α-isomer (XIII) by making use of the lower solubility in acetone of the 3β-isomer. The recovered 3β-isomer (XIV) is partially saponified to give 11-dimethylamino-18β - hydroxy - 17α - methoxy-16β-carbomethoxy-3β,20α-yohimbane (XV). By esterification of this last compound (XV) with 3,4,5-trimethoxy-benzoyl chloride the desired 11-dimethylamino-deserpidine (XVI) is obtained.

It is preferred to use triethylamine as the tertiary organic base, to effect the closure of the D-ring in a slightly acid medium and to perform the reduction with zinc in perchloric acid.

The following examples illustrate the invention without limiting it. More particularly, the reaction temperatures may be varied, the nature of the solvents, the order of introduction of the reactants and the reaction periods may be varied, or the final trimethoxy-benzoylation may be effected with trimethoxy-benzoic acid anhydride in the presence of a pyridine base and trimethylamine, in accordance with the process described in the copending U.S. patent application, S.N. 727,782, filed April 11, 1958, now U.S. Patent No. 2,926,167 without departing from the scope of the present invention. The examples will enable those skilled in the art to understand the invention more completely.

The melting points are instantaneous melting points determined on a Maquene block. The temperatures are given in degrees centigrade.

*Example I.—Preparation of 6-dimethylamino-2-carbethoxy-indole (III)*

Dry potassium ethylate equivalent to 20.8 gm. of potassium is covered with 500 cc. of anhydrous ether, the mixture is cooled and 78 cc. of diethyloxalate are added while stirring. Then a solution of 80 gm. of N,N-dimethyl-2-nitro-p-toluidine (prepared according to Hodgson, J. Chem. Soc., 1930, 277–80) in 300 cc. of ether is added very slowly to the oxalate solution. The reaction mixture is allowed to remain under agitation for 65 hours in a stream of nitrogen at room temperature. The crystalline product which forms during that period is separated by filtration and washed by triturating it several times with ether. The product is then dried in a vacuum over phosphoric anhydride, yielding 129 gm. of the potassium salt of 4-dimethylamino-2-nitrophenyl-ethyl-pyruvate (II) in the form of violet crystals.

This product is dissolved in 600 cc. of ethanol and 60 cc. of acetic acid, the solution thus obtained is heated to 60° C. and is added in small amounts to a reducing mixture of iron in hydrochloric acid obtained by treating 340 gm. of iron kish with 44 cc. of concentrated hydrochloric acid and 1 liter water until the pH is about 6, the reducing mixture being held at 90° C. After the addition is completed, the reaction mixture is heated under reflux for 1 hour and 600 to 700 cc. of aqueous ethanol are eliminated by distillation. Thereafter, 1 kg. of ice is added and the precipitate formed thereby is filtered off and washed by trituration with water. The precipitate is taken up in 1200 cc. of dioxan and the solution is heated under continuous agitation to a temperature of 95° C. It is then filtered and the operation is repeated 2 to 3 times, the quantity of solvent being reduced each time. The dioxan solutions are combined and after filtration, the combined solution is evaporated to dryness. The residue is recrystallized from 3 volumes of dioxan, yielding compound III having a melting point of 145° C. The yield is 60% of theory. This product, 6-dimethylamino-2-carbethoxy-indole (III), which is not described in the literature, is obtained in the form of white prismatic crystals which are soluble in cold ether, cold acetone, cold chloroform, cold dilute aqueous acids; hot alcohol, hot benzene, and insoluble in water and dilute aqueous alkalies.

*Analysis.*—$C_{13}H_{16}O_2N_2$; molecular weight =232.27.—Calculated: C, 67.22%; H, 6.94%; O, 13.78%; N, 12.06%. Found: C, 67.3%; H, 6.9%; O, 14.0%; N, 12.1%.

*Example II.—Preparation of 6-dimethylamino-indole-2-carboxylic acid (IV)*

40 gm. of compound III, obtained in accordance with Example I, are added to a solution of 19.4 gm. of potassium hydroxide in 400 cc. of water and the mixture is heated under reflux for 2 hours while agitating it. The resulting solution is iced and 20 cc. of glacial acetic acid are added. By extraction with ether and evaporating the solvent from the ether extract, 28.5 gm. (81% of theory) of compound IV are obtained. The melting point of this compound is impossible to determine because it decomposes under action of heat. This novel compound, 6-dimethylamino-indole-2-carboxylic acid (IV), which is not described in the literature, is obtained in the form of white prisms or plates which are soluble in cold acetone, cold dilute aqueous acids or alkalies, hot alcohol, and slightly soluble in water, ether, benzene and chloroform.

*Example III.—Preparation of 6-dimethylamino-indole (V)*

44 gm. of compound IV, obtained in accordance with Example II, are introduced into 220 cc. of anhydrous glycerin and the solution is gradually heated to 135 to 170° C. Decarboxylating takes place rapidly and after heating the solution for 10 minutes it is subjected to steam distillation at 165 to 170° C. for 2 hours. Compound V crystallizes from the distillate. The crystallized product is filtered off, washed and filtered on a vacuum filter. After drying over phosphoric anhydride, 30.7 gm. (88.5% of theory) of a white product, 6-dimethylamino-indole, which is slightly beige-colored and has a melting point of 106 to 107° C., are obtained. It is very soluble in acetone, soluble in alcohol, benzene, chloroform and dilute aqueous acids, slightly soluble in water and ether, and insoluble in dilute aqueous alkalies.

*Analysis.*—$C_{10}H_{12}N_2$; molecular weight=160.21.—Calculated: C, 74.96%; H, 7.55%; N, 17.49%. Found: C, 74.9%; H, 7.5%; N, 17.3%.

This compound is not described in the literature.

*Example IV.—Preparation of 6-dimethylamino-gramine (VI)*

30.7 gm. of compound V, obtained in accordance with Example III, are admixed with 112 cc. of an alcoholic solution of dimethylamine containing 86 mgm. of amine per cc., 1.1 gm. of ammonium chloride are added, the mixture is cooled to 0° C. and 21.6 cc. of a 29.1% aqueous solution of formaldehyde are added dropwise over a period of about 30 minutes. After all of the solution has been added the ice bath is removed and the reaction mixture is agitated for 3 hours at room temperature. It is then poured over 100 gm. of ice, acidified with acetic acid to a pH of 3,4 and the acid solution is extracted 2 to 3 times with 50 cc. of benzene in order to eliminate formaldehyde and unreacted indole. The benzene phases are combined and the combined solution is extracted in turn with 20 cc. of 10% acetic acid and then with 20 cc. of water. The aqueous extracts obtained are combined with the preceding aqueous phase. The combined aqueous extracts are heated under vacuum at 40 to 50° C. and then treated with animal charcoal and filtered. The filtrate is iced and made alkaline to a pH of 13 by adding concentrated sodium hydroxide. Crystallization is initiated by scratching and the gramine precipitates. After allowing the solution to stand overnight in a refrigerator it is filtered, the filter cake is washed with 100 cc. of water and dried over phosphoric anhydride. The yield is 15.1 gm. (36% of theory) of the raw product which, by recrystallization from 3 volumes of toluene, yields pure 6-dimethylamino-gramine having a melting point of 125.5 to 126° C. The product is soluble in acetone, alcohol, chloroform and dilute aqueous acids, slightly soluble in benzene or toluene and insoluble in water and dilute aqueous alkalies.

*Analysis.*—$C_{13}H_{19}N_3$; molecular weight=217.31.—Calculated: C,71.85%; H, 8.81%; N, 19.34%. Found: C, 72.0%; H, 8.7%; N, 19.2%.

The infra-red spectrum confirms the indicated structure and particularly shows an analogy with 6-methoxy-gramine. The compound is novel.

*Example V.—Preparation of 6-dimethylamino-indol-3-yl-acetonitrile (VII)*

(A) *Sulfomethylate of 6-dimethylamino-gramine.*—25 cc. of dimethylsulfate are admixed with 240 cc. of anhydrous tetrahydrofuran, the mixture is cooled on an ice bath, and a solution of 20 gm. of compound VI, prepared in accordance with Example IV, in 240 cc. of tetrahydrofuran is added very slowly dropwise while agitating the mixture. The sulfomethylate of 6-dimethylaminogramine begins to precipitate. After 3 hours of agitation at 0° C. the solution is filtered and the crystalline precipitate is washed with 40 cc. of tetrahydrofuran and dried in a vacuum.

(B) *Formation of the nitrile.*—The sulfomethylate obtained in accordance with (A) above is dissolved in 100 cc. of water and this solution is added to a solution of 12 gm. of potassium cyanide in 200 cc. of water. The resulting solution is heated for 3 hours at 70° C. (internal temperature), accompanied by agitation. The yellowish-brown crystals of compound VIII appear after a few minutes. After cooling the reaction solution to 0° C. it is filtered and the filter cake is washed until the wash water is neutral. The filter cake is then dried over phosphoric anhydride, yielding 15.5 gm. (85% of theory) of raw compound VII. The product is purified by dissolving it in hot acetone, treating the acetone solution with animal charcoal, concentrating the purified solution and allowing it to crystallize. The pure product, 6-dimethylamino-indol-3-yl-acetonitrile (VII), having a melting point of 198.5° C. is obtained with a yield of 42% of theory, based upon the amount of gramine starting material. It is soluble in dilute aqueous acids, and in hot acetone. In contrast thereto, it is slightly soluble in alcohol, benzene or chloroform and insoluble in water and dilute aqueous alkalies.

*Anaylsis.* — $C_{12}H_{13}N_3$; molecular weight=199.25.—Calculated: C, 72.33%; H, 6.57%; N, 21.09%. Found: C, 72.7%; H, 6.5%; N, 21.5%.

The infra-red spectrum agrees with the given structure.

The compound is not described in the literature.

*Example VI.—Preparation of 6-dimethylamino-tryptamine (I) and its salts*

6.5 gm. of compound VII, obtained in accordance with the preceding example, are admixed with 10 gm. of Raney nickel, obtained by treating 20 gm. of a 50% nickel-aluminum alloy with 600 cc. of methanol saturated with ammonia. The resulting mixture is hydrogenated for 2 hours until the theoretical quantity of hydrogen has been absorbed. The catalyst is then separated by filtration and washed twice with 20 cc. of methanol. The filtrate, after having been treated with animal charcoal, is evaporated to dryness in a vacuum. The residual oil, taken up in 50 cc. of methylene chloride, is placed on an ice bath and an approximately 10% solution of acetic acid in methylene chloride is added thereto dropwise until the base is neutralized. The acetate of compound I precipitates out and after filtering on a vacuum filter and drying the filter cake over phosphoric anhydride, 7.45 gm. of the product, which melts at approximately 154 to 158° C., are obtained. This product is decomposed with dilute sodium hydroxide, the free base is extracted with methylene chloride and the extraction solutions are washed with water and dried over sodium sulfate. By evaporation, compound I is obtained in the form of a dense oil which crystallizes difficultly. This compound, 6-dimethylamino-tryptamine, which is novel, is soluble in alcohol, chloroform, dioxane, ethoxyethanol, and methylene chloride, is slightly soluble in toluene and petroleum ether and is insoluble in water, isopropyl ether, anisole, triethylamine and butyl oxide.

By treatment with an alcoholic solution of picric acid this base yields a picrate melting at 215 to 216° C. which is obtained in the form of brownish-red needles which are soluble in alcohol and tetrahydrofuran, insoluble in water, benzene and chloroform and which decompose in dilute aqueous alkalies and acids.

Analysis.—$C_{18}H_{20}O_7N_6$; molecular weight=432.39.—Calculated: C, 50.00%; H, 4.66%; O, 25.90%; N, 19.44%. Found: C, 50.30%; H, 4.6%; O, 25.5%; N, 19.1%.

This product is not described in the literature.

The acetate of compound I is prepared as indicated above. It is recrystallized from 5 volumes of ethanol or n-propanol. The product consists exclusively of the monoacetate which has a melting point around 160° C. It is obtained in the form of white prisms which are soluble in alcohol and water, insoluble in ether, benzene and chloroform and which decompose in acetone.

Analysis.—$C_{14}H_{21}O_2N_3$; molecular weight=263.33.—Calculated: C, 63.85%; H, 8.04%; C, 12.15%; N, 15.96%. Found: C, 64.0%; H, 8.1%; C, 12.4%; N, 15.8%.

This compound is not described in the literature.

*Example VII.—Preparation of 18β-acetoxy-11-dimethylamino - 17α - methoxy - 16β - carbomethoxy - 2 - 3,3-4-diseco-$\Delta^{4(21)}$-20α-yohimbene-3-oic acid (IX)*

21.5 gm. of the acetate of 6-dimethylamino-tryptamine (I), obtained in accordance with Example VI, are put into suspension in methylene chloride and are treated with 1 N sodium hydroxide. The mixture is filtered, dried and distilled to dryness. The residue, consisting of a resin, is dissolved in 16 cc of dimethylformamide and the solution is added, while cooling to −5° C., to a solution of 33 gm. of 1β-carboxymethyl-2β-carbomethoxy-3α-methoxy-4β-acetoxy-6β-formylcyclohexane (II) dissolved in 66 cc. of water, 16 cc. of dimethylformamide and 21 cc. of triethylamine. The resultant solution is then allowed to stand for 15 minutes at −5° C. and the 18β-acetoxy - 11 - dimethylamino - 17α - methoxy - 16β - carbomethoxy-2-3,3-4-diseco-$\Delta^{4(21)}$-20α-yohimbene-3-oic acid (IX) thus obtained is used as such, without isolating it, in the next example.

*Example VIII.—Preparation of 18β-acetoxy-11-dimethylamino - 17α - methoxy - 16β - carbomethoxy - 2 - 3,3-4-diseco-20α-yohimbane-3-oic acid (X)*

8.3 gm. of potassium borohydride are added at −5° C. to the solution of compound IX, obtained in Example VII from 21.5 gm. of 6-dimethylamino-tryptamine acetate. After 15 minutes, 33 cc. of water are added and the mixture is allowed to stand at room temperature for 20 minutes, accompanied by agitation.

The solution of 18β-acetoxy-11-dimethylamino-17α-methoxy - 16β - carbomethoxy - 2 - 3,3 - 4 - diseco - 20α-yohimbane-3-oic acid (X) which results therefrom, may be used directly in the next example.

*Example IX.—Preparation of 18β-acetoxy-11-dimethylamino - 17α - methoxy - 16β - carbomethoxy - 3 - keto-2-3-seco-20α-yohimbane (XI)*

The solution of compound X, obtained in Example VIII, is acidified by an excess of acetic acid, and the solution is heated on a water bath for 20 minutes. Thereafter, ice is added and then an excess of ammonia, and the solution is extracted with methylene chloride. The extract solutions are combined, washed with water, dried and distilled to dryness, yielding a brown resin which consists of 18β-acetoxy-11-dimethylamino-17α-methoxy - 16β - carbomethoxy - 3 - keto - 2 - 3 - seco-20α-yohimbane (XI). It is used as such in the next example.

*Example X.—Preparation of 18β-acetoxy-11-dimethylamino - 17α-methoxy-16β-carbomethoxy-$\Delta^{3(14)}$-20α-yohimbene (XII)*

The raw compound XI, obtained in Example IX, is refluxed in 120 cc. of phosphorus oxychloride. After two hours of heating the solution is evaporated to dryness under vacuum, the residue is taken up in 120 cc. of acetone and concentrated ammonia is added to the acetone solution, accompanied by cooling. A white mineral precipitate forms and redissolves, and then compound XII begins to crystllize out.

The crystals are separated by vacuum filtration, washed with water and methanol, and dried, yielding 18 gm. (which is 47% of the theoretical yield based on the amount of 6-dimethylamino-tryptamine acetate originally used) of an orange-rose product having a melting point of about 260° C. By recrystallization from aqueous acetone pure 18β-acetoxy-11-dimethylamino-17α-methoxy-16β-carbomethoxy-$\Delta^{3(14)}$-20α-yohimbene (XII) having a melting point of 262° C. is obtained in the form of fine orange-rose needles which are soluble in acetone, chloroform and dilute aqueous acids, slightly soluble in alcohol, and insoluble in water, dilute aqueous alkalies and ether.

Analysis.—$C_{26}H_{33}O_5N_3$; molecular weight=467.55.—Calculated: C, 66.79%; H, 7.11%; N, 8.99%. Found: C, 66.6%; H, 7.2%; N, 9.0%.

The infra-red spectrum confirms the given structure. This compound is not described in the literature.

*Example XI.—Preparation of 18β-acetoxy-11-dimethylamino - 17α-methoxy-16β-carbomethoxy-3α,20α-yohimbane (XIII)*

6 cc. of methanol and 1.2 cc. of 2 N hydrochloric acid are added to 200 mgm. of compound XII, obtained in Example X, and, while cooling, potassium borohydride is added until the mixture is decolorized and turns alkaline. The reaction mixture is then allowed to stand for 5 minutes at 10° C., and then water is slowly added until crystallization takes place. After separating the crystals by vacuum filtration, washing them with water and methanol, and drying them 175 mgm. (87% of theory) of compound XIII are obtained, which is purified by recrystallization from aqueous acetone. The purified product had a melting point first of 230° C. and then at 254° C., and a specific rotation $[\alpha]_D^{20}= -75° \pm 10$ (c.=0.5% in pyridine). The compound, 18β-acetoxy-11 - dimethylamino - 17α-methoxy-16β-carbomethoxy-3α-20α-yohimbane (XIII), which is not described in the literature, is obtained in the form of cream-colored, star-shaped crystals which are soluble in acetone, chloroform and aqueous dilute acids, slightly soluble in alcohol, and insoluble in water, dilute aqueous alkalies and ether.

Analysis.—$C_{26}H_{35}O_5N_3$; molecular weight=469.56.—Calculated: C, 66.50%; H, 7.51%; N, 8.95%. Found: C, 66.7%; H, 7.5%; N, 9.0%.

The infra-red spectrum agrees with the indicated structure.

*Example XII.—Preparation of 18β-acetoxy-11-dimethylamino-17α-methoxy-16β-carbomethoxy-3β,20α - yohimbane (XIV)*

A mixture of 18 gm. of compound XII, obtained in accordance with Example X, 180 cc. of acetone, 180 cc. of 13% perchloric acid and 1.8 cc. of a 45° Bé. solution of ferric chloride is heated to boiling under reflux, and then 36 gm. of zinc powder are added. The reaction mixture is refluxed and stirred for one half hour. Decoloration is almost complete. The mixture is poured over ice, while leaving the zinc at the bottom of the reaction vessel, concentrated ammonia is added to the solution and it is extracted with methylene chloride. The extract solution is dried and distilled to dryness and the residue is taken up in 35 cc. of acetone. The acetone solution is iced, filtered, the filter cake is washed with acetone and dried at 90° C. The yield is 5.34 gm. (29% of theory) of compound XIV having a melting point above 300° C. By recrystalization from acetone the pure product, 18β-acetoxy-11-dimethylamino-17α-methoxy-16β-carbomethoxy-3β,20α-yohimbane (XIV), having a melting point of 311° C. and a specific rotation $[\alpha]_D^{20} = -115° \pm 10$ (c.=0.5% in pyridine) is obtained. This compound is obtained in the form of yellowish rhombic crystals which are soluble in dilute aqueous acids, slightly soluble in acetone, alcohol and chloroform, and insoluble in water, dilute aqueous alkalies and ether.

Analysis.—$C_{26}H_{35}O_5N_3$; molecular weight=469.56.—Calculated: C, 66.50%; H, 7.51%; O, 17.04%; N, 8.95%. Found: C, 66.5%; H, 7.4%; O, 16.7%; N, 8.8%.

The infra-red spectrum confirms the given structure and particularly makes it possible to identify the 3β-isomer.

The compound is not described in the literature.

*Example XIII.—Preparation of 11-dimethylamino-18β-hydroxy - 17α - methoxy - 16β - carbomethoxy - 3β,20α-yohimbane (XV)*

A mixture of 2.8 gm. of compound XIV, obtained in Example XII, with 112 cc. of methanol and 1.12 gm. of potassium borohydride is refluxed for 3 hours. The solution is then concentrated to a volume of 5 cc. poured into water and extracted with methylene chloride. The extract solutions are combined and distilled to dryness, yielding a residue which is taken up in a mixture of ethyl acetate and ether (4:6), the insoluble mixture is filtered, and the filter cake is washed and dried. The yield is 1.85 gm. (72% of theory) of compound XV having a melting point of 199° C. and a specific rotation $[\alpha]_D^{20} = -130 \pm 10$ (c.=0.5% in pyridine). It is recrystallized, for analysis, from a mixture of acetone and petroleum ether, its physical constants do not change. The product, 11-dimethylamino - 18β - hydroxy - 17α - methoxy - 16β - carbomethoxy-3β,20α-yohimbane (XV), which is obtained in the form of beige-rose platelets, is soluble in acetone, chloroform, alcohol and aqueous dilute acids, and insoluble in water, dilute aqueous alkalies and ether.

Analysis.—$C_{24}H_{33}O_4N_3$; molecular weight=427.53.—Calculated: C, 67.42%; H, 7.78%; O, 14.97%; N, 9.83%. Found: C, 67.0%; H, 7.8%; O, 14.9%; N, 10.0%.

The infra-red spectrum confirms the indicated structure.

The compound is not described in the literature.

*Example XIV.—Preparation of 11-dimethylamino-deserpidine (XVI)*

500 mgm. of compound XV, obtained in Example XIII, are admixed with 1,125 gm. of 3,4,5-trimethoxy-benzoyl chloride and 5 cc. of pyridine, and the mixture is heated for 17 hours at 75° C. in a closed tube. After cooling, 2 cc. of water are added, the solution is heated at 40° C. for 15 minutes and then more water and ammonia in excess are added. The brick-red precipitate formed thereby is separated on a vacuum filter and washed with water. It is then taken up in ether, the black oil formed thereby is decanted, the ethereal solution is stirred with 2 gm. neutral alumina, filtered, concentrated to 2 cc. and petroleum ether is added. The precipitate formed thereby is separated on a vacuum filter, washed and dried in the cold under a vacuum, yielding a rose amorphous powder weighing 380 mgm., which consisted of compound XVI, 11-dimethylamino-deserpidine, having a melting point of 150–160° C.

The compound is not described in the literature.

The preceding examples were given purely for descriptive purposes and are not to be limitive of the invention. Such changes and modifications as would occur to one skilled in the art may be made without departing from the spirit of the invention or the scope of the appended claim.

We claim:

11-dimethylamino-deserpidine.

References Cited in the file of this patent

UNITED STATES PATENTS

| | | |
|---|---|---|
| 2,708,197 | Speeter | May 10, 1955 |
| 2,796,420 | Weisenborn | June 18, 1957 |
| 2,857,385 | Kuehne | Oct. 21, 1958 |
| 2,920,080 | Bucourt et al. | Jan. 5, 1960 |

OTHER REFERENCES

Velluz et al.: Bull. Soc. Chim., France (1958), pp. 673–677.

UNITED STATES PATENT OFFICE
Certificate of Correction

Patent No. 2,985,659                                                              May 23, 1961

Leon Velluz et al.

It is hereby certified that error appears in the above numbered patent requiring correction and that the said Letters Patent should read as corrected below.

Column 1, lines 27 to 39, formula (XVI) should appear as shown below instead of as in the patent:

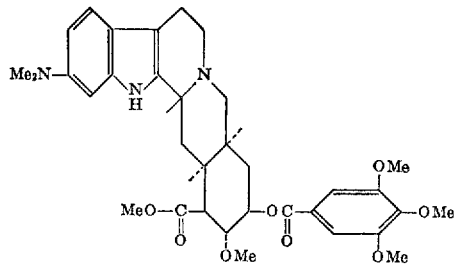

column 4, formula XI should appear as shown below instead of as in the patent:

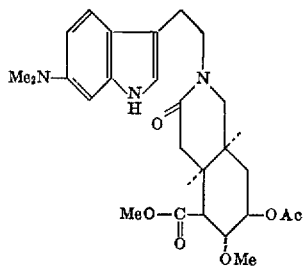

same column 4, formula XII should appear as shown below instead of as in the patent:

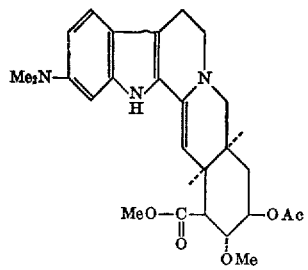

same column 4, formula XIII should appear as shown below instead of as in the patent:

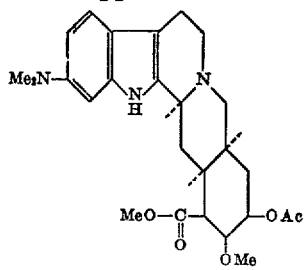

column 5, formula XIV should appear as shown below instead of as in the patent:

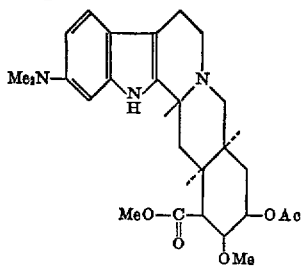

columns 5 and 6, formula XV should appear as shown below instead of as in the patent:

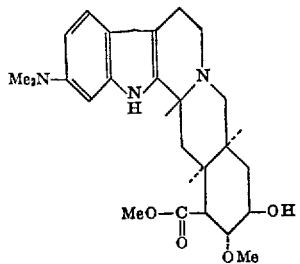

column 5, formula XVI should appear as shown below instead of as in the patent:

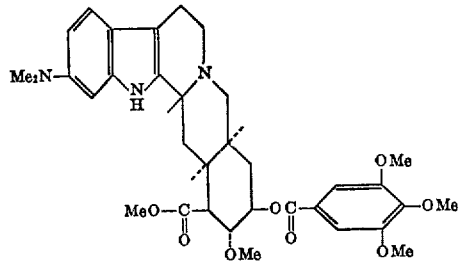

column 8, line 30, for "VIII" read —VII—; column 12, line 10, for "1,125" read —1.125—.

Signed and sealed this 21st day of November 1961.

[SEAL]

Attest:
ERNEST W. SWIDER,
*Attesting Officer,*

DAVID L. LADD,
*Commissioner of Patents.*